United States Patent
Hareyama et al.

(10) Patent No.: US 7,288,217 B2
(45) Date of Patent: Oct. 30, 2007

(54) ELECTROCONDUCTIVE COMPOUND IN FLAKE FORM AND ELECTROCONDUCTIVE COMPOSITION

(75) Inventors: Yukiya Hareyama, Tokushima (JP); Hidetoshi Ogawa, Tokushima (JP)

(73) Assignee: Otsuka Chemical Co., Ltd., Osaka (JP)

( * ) Notice: Subject to any disclaimer, the term of this patent is extended or adjusted under 35 U.S.C. 154(b) by 462 days.

(21) Appl. No.: 10/521,939

(22) PCT Filed: Jul. 16, 2003

(86) PCT No.: PCT/JP03/09010

§ 371 (c)(1),
(2), (4) Date: Jan. 21, 2005

(87) PCT Pub. No.: WO2004/010439

PCT Pub. Date: Jan. 29, 2004

(65) Prior Publication Data

US 2006/0097230 A1    May 11, 2006

(30) Foreign Application Priority Data

Jul. 23, 2002  (JP) .............................. 2002-214488

(51) Int. Cl.
*C23C 28/04* (2006.01)
*C08K 3/22* (2006.01)
*H01B 1/12* (2006.01)
*B32B 5/16* (2006.01)

(52) U.S. Cl. ............... 252/500; 252/518.2; 252/520.2; 428/357; 428/402; 428/403; 428/404; 524/497; 106/428; 106/430; 106/436; 106/499; 427/255.32; 427/255.3

(58) Field of Classification Search ................ 252/500, 252/518.2, 520.2; 423/598, 610; 428/357, 428/402, 403, 404; 524/497; 106/428, 430, 106/436, 499; 427/255.32, 255.3
See application file for complete search history.

(56) References Cited

U.S. PATENT DOCUMENTS

| | | | |
|---|---|---|---|
| 4,373,013 A | 2/1983 | Yoshizumi | 428/570 |
| 6,706,109 B2 * | 3/2004 | DeLuca, Jr. | 106/415 |
| 2005/0253117 A1 * | 11/2005 | Pfaff et al. | 252/500 |

FOREIGN PATENT DOCUMENTS

| | | | |
|---|---|---|---|
| JP | 57-180638 A | | 11/1982 |
| JP | 58-76266 A | | 5/1983 |
| JP | 61-218639 A | | 9/1986 |
| JP | 2-120373 A | | 5/1990 |
| JP | 2-194071 A | | 7/1990 |
| JP | 10-147891 | * | 6/1998 |
| JP | 10-147891 A | | 6/1998 |
| JP | 10-147892 | * | 6/1998 |
| JP | 10-147892 A | | 6/1998 |
| JP | 10-309513 A | | 11/1998 |
| JP | 2001-98092 A | | 4/2001 |

* cited by examiner

*Primary Examiner*—Mark Kopec
*Assistant Examiner*—Kallambella Vijayakumar
(74) *Attorney, Agent, or Firm*—Kubovcik & Kubovcik

(57) ABSTRACT

An electroconductive compound in a flake form, characterized in that it comprises a titanium oxide which has an average long diameter of 1 to 100 μm and an average thickness of 0.01 to 1.5 μm, and contains potassium in an amount of 0.3 to 5 wt % in terms of potassium oxide ($K_2O$) and, formed on the surface thereof, a first electroconductive layer comprising a tin oxide containing antimony and, formed on the first electroconductive layer, a second electroconductive layer comprising a tin oxide.

20 Claims, No Drawings

ELECTROCONDUCTIVE COMPOUND IN FLAKE FORM AND ELECTROCONDUCTIVE COMPOSITION

This application is a 371 of international application PCT/JP03/09010, which claims priority based on Japanese patent application No. 2002-214488 filed Jul. 23, 2002, which is incorporated herein by reference.

1. Technical Field

The present invention relates to a flake-form conductive compound and a conductive composition.

2. Background Art

Various, synthetic resins such as polyolefinic, polyamide and styrenic resins have been conventionally used to fabricate bumpers, door-side laces, door mirrors and other exterior automotive trim parts in order to achieve weight reduction of an automobile and consequently save its fuel consumption. This has even developed into recent sales of passenger cars provided with doors made of synthetic resins.

Exterior automotive trim parts made of synthetic resins (hereinafter referred to as "resin-made exterior trim parts") are generally painted with a color consistent with that of a main body of an automobile. In application of paint coatings to such a resin-made exterior trim part which generally has insulation properties attributed to synthetic resins, a method is generally utilized which involves providing on its surface a conductive primer layer comprising a matrix resin and a conductive material and then electrostatically providing a paint film layer on the primer layer. Under the circumstances where reduction of emissions of exhaust gases is requested to prevent global warming, thickness reduction of the conductive primer layer and paint film layer is becoming one of important technical objects in such an electrostatic coating process for further saving of fuel consumption. The conductive primer layer, in particular, is expected to reduce its film thickness to the level of 1-10 μm while keeping its surface resistivity at the level of $10^4$-$10^8 \Omega$ that is required for subsequent formation of a uniform and fine paint film layer.

Examples of conductive materials contained in the conductive primer layer include powdery conductive materials such as carbon black, graphite and metal powder; fibrous conductive materials such as carbon fiber, potassium titanate fiber coated on its face with carbon black or other carbon materials, and titanium oxide fiber; flaky conductive materials such as nickel-coated mica and metal flake; and the others (see, for example, Japanese Patent Laying-Open Nos. Sho 57-180638, Sho 58-76266, Sho 61-218639, Hei 2-120373, Hei 2-194071, Hei 10-309513 and 2001-98092). However, when these conventional conductive materials are used in the formation of a conductive primer layer having a surface resistivity level of $10^4$-$10^8 \Omega$ that is suited for subsequent electrostatic coating, the required loadings thereof make it difficult to reduce the film thickness of the conductive primer layer. In the attempt to reduce its film thickness, loadings of conventional conductive materials may be lowered. At such lower loadings, the surface resistivity may not reach the desired level and may vary widely at locations. This possibly causes the occurrence of uneven coating. That is, the conductive primer layer containing such conventional conductive materials is difficult to reconcile the surface resistivity level of $10^4$-$10^8 \Omega$ and the film thickness level of 1-10 μm.

A flaky conductive material made by sequentially forming a first conductive layer comprising tin oxide and antimony oxide and a second conductive layer comprising tin oxide on a face of a substrate is known (Japanese Patent Laying-Open No. Hei 10-147891). It is also known that the substrate material can be selected from such flakes as mica, talc, glass flake, alumina flake and titania flake (titanium oxide flake). However, these flaky conductive materials are somewhat colored. Accordingly, in the case where the paint film layer presents a beige, white blue or other light color, application of such flaky conductive materials to the primer layer disadvantageously spoils the color of the paint film layer. Neither of these conventionally-known flaky conductive materials results in the thin film which satisfies both the surface resistivity level of $10^4$-$10^8 \Omega$ and the film thickness level of 1-10 μm.

DISCLOSURE OF THE INVENTION

It is an object of the present invention to provide a flake-form conductive compound which, even if formulated into a 1-10 μm thick layer, can impart good conductive properties, as well as providing a conductive composition comprising this compound incorporated in a binder.

The flake-form conductive compound of the present invention is characterized as comprising titanium oxide having an average major diameter of 1-100 μm and an average thickness of 0.01-1.5 μm and containing 0.3-5% by weight of potassium in terms of potassium oxide ($K_2O$), a first conductive layer comprising tin oxide containing antimony and provided on a surface of the titanium oxide, and a second conductive layer comprising tin oxide and provided on the first conductive layer.

In the present invention, the average major diameter and average thickness can be determined by observation under a scanning electron microscope (SEM) or transmission electron microscope (TEM). The average major diameter can also be approximately measured by a laser diffraction particle-size distribution measurement device. Plate-, flake- or sheet-form inorganic compounds, such as the flake-form conductive compound of the present invention, generally have quadrilateral or polygonal shapes. Due to such irregular shapes, they measure varied particle diameters at different measurement locations. The major diameter, as used herein, refers to the longest one among such particle diameters.

In the present invention, the first conductive layer preferably contains 0.1-50% by weight of an antimony component in terms of antimony oxide ($Sb_2O_3$), based on 100 parts by weight of a tin component in terms of tin oxide ($SnO_2$).

The flake-form conductive compound of the present invention can be obtained by allowing a basic compound having an interlayer swelling effect to act on layered titanic acid to thereby delaminate the layered titanic acid into titanic acid flakes, applying a stannic compound to form a first conductive layer on the flake-form titanic acid, applying a stannous compound to form a second conductive layer on the first conductive layer and subjecting the combination to a heat treatment.

The conductive composition of the present invention is characterized as comprising a binder and the flake-form conductive compound of the present invention incorporated in the binder.

Preferably, the flake-form conductive compound is loaded in the amount of 5-50 parts by weight, based on 100 parts by weight of the binder.

The binder may be of one or more types selected from thermoplastic resins, thermosetting resins, inorganic aggregates and metal-containing organic compounds.

DETAILED EXPLANATION OF THE INVENTION

Characteristically, the flake-form conductive compound of the present invention uses, as a substrate, flake-form titanic acid (hereinafter referred to simply as "flake-form titanic acid", unless otherwise stated explicitly) which has an average major diameter of 1-100 µm, preferably 1-10 µm, has an average thickness of 0.01-1.5 µm, preferably 0.01-1.0 µm, and contains 0.3-5 weight % of potassium in terms of potassium oxide ($K_2O$).

This flake-form titanic acid can be obtained, for example, by subjecting layered titanate (1) represented by a general formula $K_xM_y\square_zTi_{2-(y+z)}O_4$ (1) (wherein M represents a metal having a valence of 1-3, $\square$ represents a defect site of Ti, x is a positive real number and satisfies $0<x<1.0$, and y and z are independently 0 or a positive real number and satisfy $0<y+z<1.0$.) to an acid treatment so that 75-99% of K and/or M ions is substituted by hydrogen ions or hydronium ions for obtaining a layered titanic acid; and allowing a basic compound having an interlayer swelling effect to act on the layered titanic acid to thereby delaminate the layered titanic acid.

In the general formula (1), M is a metal other than K, has a valence of 1-3 and is preferably at least one selected from Li, Mg, Zn, Cu, Fe, Al, Ga, Mn and Ni.

The layered titanate (1) can be produced, for example, by methods disclosed in prior art references such as Japanese Patent No. 3062497. Specifically, a raw material is prepared from respective oxides of metals K, M and Ti or respective compounds which when heated produce such oxides. This raw material and one or more fluxes selected from halides or sulfates of alkaline metals or alkaline earth metals are mixed such that a flux/raw material weight ratio is brought to 0.1-2.0. The mixture is subsequently calcined at 700-1,200° C. to provide the layered titanate.

The heat treatment of the layered titanate (1) is carried out according to a known method, e.g., by adding an acid to an aqueous slurry of the layered titanate (1), preferably under agitation. The concentration of the layered titanate (1) is not particularly specified and may be suitably selected from a wide range depending on the type of the layered titanate (1) used and the like. In consideration of efficient substitution of hydrogen or hydronium ions for 70-99% of potassium ions and/or M ions, its concentration is generally maintained at a level of 0.01-10 weight %, preferably 0.1-5 weight %. The acid is not particularly specified in type. Those known in the art are useful without limitation. Examples of acids include mineral acids such as hydrochloric acid, sulfuric acid and nitric acid; organic acids such as formic acid, acetic acid, propionic acid and oxalic acid; and the like. Among them, inorganic acids are preferred. Particularly preferred is hydrochloric acid. Such acids can be used alone or in combination if necessary. The acid is generally used in the form of its aqueous solution. The acid concentration of the aqueous solution is not particularly specified and may be chosen from a wide range depending on the type of the acid used and the like. In consideration of efficient substitution of hydrogen or hydronium ions for 70-99% of potassium ions and/or M ions, the acid concentration is generally maintained at a level of 0.0001-10 weight %, preferably 0.001-0.1 weight %. Such an acid treatment may be repeated. This results in the substitution of hydrogen or hydronium ions in the layered titanate (1) for 70-99% of K ions and/or M ions, thus obtaining a layered titanic acid (1a).

Subsequently, the basic compound having an interlayer swelling effect is brought to act on this layered titanic acid (1a) for delamination thereof, thereby obtaining flake-form titanic acid. More specifically, the basic compound having an interlayer swelling effect may be added with stirring to an aqueous slurry of the layered titanic acid (1a), for example.

The concentration of the layered titanic acid (1a) in the aqueous slurry is not particularly specified and may be chosen from a wide range depending on the types of the layered titanic acid (1a) and basic compound, reaction conditions and the like.

Examples of basic compounds having an interlayer swelling effect include alkylamines such as methylamine, ethylamine, n-propylamine, diethylamine, triethylamine, butylamine, pentylamine, hexylamine, octylamine and dodecylamine, and their salts; alkanolamines such as ethanolamine, diethanol-amine, triethanolamine, isopropanolamine, diisopropanolamine, triisopropanolamine and 2-amino-2-methyl-1-propanol; quaternary ammonium hydroxides such as tetramethylamnonium hydroxide, tetraethylammonium hydroxide, tetrapropylammonium hydroxide and tetrabutylammonium hydroxide, and their salts; quaternary ammonium salts such as cetyltrimethylammonium salt, stearyltrimethylammonium salt, benzyltrimethylammonium salt, dimethyldistearylamine salt, dimethylstearylbenzylammonium salt; and the like. These basic compounds may be used alone or in combination. The loading of the basic compound is preferably 5-40 equivalent % of a total equivalent of the layered titanic acid (1a). This enables delamination of the layered titanic acid to the titanic acid flakes having an average thickness of 0.01-1.5 µm.

Preferably, application of a high shear force is avoided when the basic compound is added with stirring. This results in obtaining the flake-form titanic acid which is comparable in particle-size distribution to the layered titanate as a starting material. Also, the resulting flake-form titanic acid is prevented from being finely divided.

After action of the basic compound, an acid treatment may follow, when needed, to remove a remaining portion of the basic compound so that the flake-form titanic acid is rendered to contain 0.3-5 weight % of potassium in terms of potassium oxide ($K_2O$).

The thus-obtained flake-form titanic acid consists of several tens-several hundreds of layers, has an average major diameter generally of 1-100 µm, preferably 1-10 µm, and an average thickness generally of 0.01-1.5 µm, preferably 0.01-1 µm, and contains 0.3-5 weight of potassium in terms of potassium oxide ($K_2O$).

If the potassium content falls below 0.3 weight %, the flake-form titanic acid may become difficult to retain its desirable shape. Also, unfavorable coloring may result when a resin incorporating the flake-form titanic acid is formed into a thin film. If the potassium content exceeds 5 weight %, the formulated flake-form conductive compound may be reduced in conductivity to result in the failure to obtain a desired electrical conduction level.

The first and second conductive layers can be coated on the flake-form titanic acid according to a method described in Japanese Patent Laying-Open No. Hei 10-147891, for example.

In an exemplary procedure according to this method, the flake-form titanic acid is first dispersed in water. While keeping a system generally at a pH of 2-5 by adding an alkaline agent, a stannic compound and an antimony compound are added thereto for mixing therewith (first stage). Then, while keeping the system at a pH of 2-5 by adding an alkaline agent, as analogous to the first stage, a stannous compound is added thereto for mixing therewith (second stage). Removal of a solid matter from the mixture, followed by drying and heating, results in obtaining the flake-form conductive compound of the present invention.

At the first stage, a concentration of the flake-form titanic acid in the aqueous dispersion is not particularly specified and may be suitably selected from a range that enables a first-stage reaction to proceed smoothly and also eases a reaction operation.

Preferably, the stannic compound used in the first stage is a compound of tetravalent tin. Examples of such compounds include stannic chloride, stannic sulfate, stannic nitrate and the like. These stannic compounds may be used alone or in combination. The antimony compound is a compound of trivalent antimony and may take various forms such as a chloride, sulfate and nitrate. In general, its chloride (antimony trichloride) is readily available. These antimony compounds may be used alone or in combination. The amounts of the stannic compound and antimony compound used in this stage are not particularly specified and can be selected from wide ranges depending on the desired conductive performance and contemplated uses. A total amount of these compounds (in terms of their oxides, $SnO_2$ and $Sb_2O_3$) is generally at least 3 parts by weight, preferably 5-20 parts by weight, based on 100 parts by weight of the flake-form titanic acid. Also, the ratio in amount of the stannic compound to antimony compound is not particularly specified and can be selected from a wide range depending on various conditions, e.g., desired conducting performance of the flake-form conductive compound and contemplated uses thereof. The antimony compound is generally used in the amount of 0.1-50 parts by weight, preferably 1-30 parts by weight, based on 100 parts by weight of the stannic compound, in terms of their respective oxides. The stannic compound and antimony compound are preferably used in the form of an aqueous solution. The concentration of each compound in its aqueous solution is not particularly specified and can be suitably selected from a range that assures smooth proceeding of a reaction. Preferably, these compounds are used in the mixed form.

The alkaline agent can be chosen from those known in the art. Examples of alkaline agents include alkaline metal hydroxides such as sodium hydroxide and potassium hydroxide; alkaline metal carbonates such as sodium carbonate and potassium carbonate; ammonium carbonate; aqueous ammonia; and the like. Such alkaline agents may be used alone or in combination when needed. Preferably, the alkaline agent is used in the form of an aqueous solution. The amount of the alkaline agent used may be suitably selected to maintaining a system at a pH of 2-5.

The first stage may be carried out, for example, by dripping an aqueous solution containing the stannic compound and the antimony compound to an aqueous dispersion of the flake-form conductive titanic acid under agitation while a system is kept generally at a pH of 1-5 by dropwise addition of an aqueous solution of the alkaline agent. This reaction can be effected at room temperature but preferably at an elevated temperature of 50-80° C. The reaction may be terminated at the end of the dripping. Preferably, the reactants are left to stay under agitation for about 0.5-5 hours after the end of the dripping. This reaction produces a stannic hydroxide and an antimony hydroxide within a system. These deposit on a surface of the flake-form titanic acid to form a first deposition layer.

The second stage can be carried out in the same manner as in the first stage, with the exception that the stannous compound is used in place of the stannic acid and antimony compound. For example, the second stage can be carried out by adding the stannous compound to the aqueous dispersion of the flake-form conductive titanic acid having the first deposition layer on its surface, as obtained in the first stage, under agitation, while a system is kept generally at a pH of 2-5 by dropwise addition of an aqueous solution of the alkaline agent.

The stannous compound is a compound of divalent tin. Specific examples include stannous chloride, stannous sulfate, stannous nitrate and the like. Such stannous compounds may be used alone or in combination. The amount of the stannous compound used is not particularly specified and can be suitably selected from a wide range depending on various conditions, e.g., the contemplated uses of the resulting flake-form conductive compound, the amount of the first deposition layer and the proportion of the stannic hydroxide and antimony hydroxide present in the deposition layer. The stannous compound may be generally added in the amount of at least 3 parts by weight, preferably 5-20 parts by weight, based on 100 parts by weight of the flake-form titanic acid as a core material. The stannous compound is generally used in the form of an aqueous solution. The concentration of the stannous compound in the aqueous solution is not particularly specified and may be suitably selected from a range that assures smooth proceeding of a reaction under the reaction conditions used.

Likewise with the first stage, the second stage can also be carried out at room temperature but may preferably be carried out at an elevated temperature of 50-80° C. The reaction may be terminated at the end of the dripping. Preferably, the reactants are left to stay under agitation for about 0.5-5 hours after the end of the dripping. This reaction produces a stannous hydroxide within a system. This deposits on the first deposition layer overlying the flake-form titanic acid.

A separating means known in the art, such as filtering or centrifuging, can be utilized to remove a solid matter from the aqueous dispersion obtained after the end of the second stage The solid matter is dried generally at a temperature of 50-200° C., preferably 90-120° C. Drying is performed generally for 1-30 hours, preferably for 10-20 hours.

After the drying, the solid matter is heated by exposure to a temperature of 200-1,000° C., preferably 300-600° C. Heating generally continues for 30 minutes-5 hours, preferably 1-3 hours. By this heating, the titanic acid portion as a core material is converted to titanium dioxide. Further, the stannous hydroxide, stannic hydroxide and antimony hydroxide are converted to their respective oxides.

The thus-obtained flake-form conductive compound of the present invention is a conductive material which includes flake-form titanium oxide as a substrate, a first layer comprising antimony-containing tin oxide and provided on a surface of the flake-form titanium oxide, and a second layer comprising tin oxide and provided on the first layer. In the above-described manufacture example, the tin oxide existing both in the first and second layers comprises a combination of stannous oxide and stannic oxide. Such a constitution imparts improved conductive properties to the material of the present invention. However, this is not intended to exclude the cases where the first and second layers both comprise either one of stannous oxide and stannic oxide. The thickness of the first layer is not particularly specified but may generally be 5-20 nm. The thickness of the second layer is generally 5-20 nm.

Antimony, in the first conductive layer of the flake-form conductive compound of the present invention, is believed to exist in the form of its oxide or a solid solution with tin oxide.

The flake-form titanic acid may be subjected to any known surface treatment or surface coating in order to improve its dispersibility. When necessary, a dispersion stabilizer may be added to the dispersion of the flake-form titanic acid.

The conductive composition of the present invention contains a binder and the aforesaid flake-form conductive compound. The blending proportion of such components is not particularly specified and can be suitably selected from a wide range depending on the type of the binder used, contemplated uses of the resulting composition and the others. Considering conductivity, mechanical strength, processibility and thin film-forming properties of the resulting composition, the flake-form conductive compound is generally used in the amount of 5-200 parts by weight, preferably 10-50 parts by weight, relative to 100 parts by weight of the binder.

The binder is not particularly specified in type. Matrix materials known in the art are useful, so long as they can disperse the flake-form conductive compound. Preferred among them are thermoplastic resins, thermosetting resins, inorganic aggregates, metal-containing organic compounds and the like. Such binders may be used alone or in combination when needed.

Specific examples of thermoplastic resins include polyethylene, polypropylene, polyisoprene, chlorinated polyethylene, polyvinyl chloride, polybutadiene, polystyrene, high impact polystyrene, acrylonitrile-styrene resin (AS resin), acrylonitrile-butadiene-styrene resin (ABS resin), methylmethacrylate-butadiene-styrene resin (MBS resin), methylmethacrylate-acrylonitrile-butadiene-styrene resin (MABS resin), acrylonitrile-acrylic rubber-styrene resin (AAS resin), acrylic resin, polyesters (polyethylene terephthalate, polybutylene terephthalate, polyethylene naphthalate and the like), polycarbonate, polyphenylene ether, modified polyphenylene ether, aliphatic polyamide, aromatic polyamide, polyphenylene sulfide, polyimide, polyether ether ketone, polysulfone, polyarylate, polyether ketone, polyether ketone ketone, polyether nitrile, polythioether sulfone, polyether sulfone, polybenzimidazole, polyamideimide, polyether imide, polyacetal, liquid crystal polymer and the like. These thermoplastic resins may be used alone or in combination when needed.

Specific examples of thermosetting resins include polyurethanes, phenol resins, melamine resins, urea resins, unsaturated polyester resins, diallylphthalate resins, silicone resins, epoxy resins (bisphenol A epoxy resins, bisphenol F epoxy resins, phenol novolak epoxy resins, cresol novolak epoxy resins, cyclic aliphatic epoxy resins, glycidyl ester epoxy resins, glycidyl amine epoxy resins, heterocyclic epoxy resins, urethane modified epoxy resins, brominated bisphenol A epoxy resins) and the like. These thermosetting resins may be used alone or in combination when needed.

Specific examples of inorganic aggregates include insoluble, non-fusible or plastic binders prepared by curing one or more of silicate, phosphate, borate and other inorganic curable substances, their precursors or hydrates by exposure to heat, light, electron beam or catalyst. These inorganic aggregates may be used alone or in combination when needed.

Specific examples of metal-containing organic compounds include organosilicon compounds, organotitanium compounds, organophosphorus compounds, organoboron compounds and the like. These metal-containing organic compounds may be used alone or in combination when needed.

Among the above-cited binders, thermoplastic resins and thermosetting resins are preferably used in the present invention. The use of thermoplastic resin is particularly preferred.

The conductive composition of the present invention may further contain one or more of the following within the range that does not adversely affect its desirable properties: conductive materials, other than the flake-form conductive compound of the present invention, which in particular have lamellar (or platy or flaky), fibrous, granular and balloon shapes; inorganic fillers; pigments; organic solvents; antioxidants; antistatic agents; mold release agents; lubricants; heat stabilizers; flame retardants; antidrip agents; ultraviolet absorbers; light stabilizers; light screening agents; metal inactivators; antiaging agents; plasticizers; impact strength improvers and compatibilizers.

The conductive composition of the present invention can be prepared by mixing and/or kneading the binder and flake-form conductive compound in the specific amounts, optionally other additives in suitable amounts, by a method known in the art. Those components, respectively in the form of a powder, bead, flake or pellet, may be mixed by means of an extruder such as a single-screw or twin-screw extruder, and/or kneaded by means of a kneader such as a Banbury mixer, pressure kneader or twin roll to thereby prepare the conductive material of the present invention, for example. The composition can be formed into a film, sheet or other arbitrary shape by a known processing means such as pressing, injection, extrusion or casting. Also, the composition can be formulated into an adhesive, paint, ink or paste, depending on its use contemplated.

Other than the use as a primer for electrostatic coating of plastic trim parts, the conductive composition of the present invention can also find various uses that require electrical conductivity by suitably selecting the types of the binder, serving as a matrix, and the other components depending on the particular uses.

Specific uses include housings and coating compositions for pinball machines and electric and electronic devices such as displays, personal computers, word processors, CD players, MD players, DVD players, headphone stereos, portable telephones, PHS, PDA (portable digital assistants, e.g., electronic organizers), tranceivers, video cameras, digital cameras, cameras, plain paper copiers, printers and facsimiles; structural parts (e.g., belts, rolls, bearings of rotary members, carrier tapes, reels for carrier tapes and reels for magnetic tapes) and packaging materials (e.g., bags, trays, magazines and containers); workboards for use in transporting parts of electronic and precision devices, e.g., sheets, films, trays, carriers, wafer baskets and packages for use in transporting IC, LSI and other semiconductor elements; connectors and anisotropic conductive films for flat package IC, leadless chip carrier IC, flexible printed boards and the like; conductive pastes for electrical connection of printed circuit boards, for via holes and through holes and for formation of patterns; conductive pastes for inductors, condensers and resonators and other ceramic structures; antistatic films for use in LCD, electrochromic devices, electroluminescent devices, solar cells, light modulation films and optical shutters; adhesives for mounting semiconductor elements and light emitting diodes; leak magnetic wave shielding films, coatings and pastes for display devices such as CRT (cathode ray tube), LCD (liquid crystal display) and PDP (plasma display); terminal electrodes for electronic parts such as electrodes, multilayer ceramic condensers, multilayer inductors, piezoelectric conductors, resistors and printed circuit boards; electrodes and coating compositions for film cells, solar cells, secondary cells and other cells; jigs for use in manufacture of semiconductor devices and electronic parts; separation craws for image formation devices; conductive transfer tapes for adhesion of electronic contacts or for electromagnetic screening; digitizer tablets; pressure resistance converters; pressure volume converters; flat cables; gaskets; floor, wall and ceiling materials for clean rooms, food hygiene rooms and hospital measurement rooms; fuel tanks; weak current gears; pulleys; hair brushes; hoses for organic solvents; coating compositions for welding contacts; magnetic tapes; compounds or adhesives for shield lamination of power insulation cables, direct current cables and other cables; PTC devices; conductive papers; conductive nonwoven fabrics; antistatic gloves; and the like. The conductive composition of the present invention are also useful as a heat-conduction or heat-dissipation compound, coating composition, paste, adhesive or sheet. Also, the conductive compound of the present invention can be spanned to provide fibers. Fabrics made of such fibers can be used as carpets, mats, sheets or interior trim materials for transport tools, such as passenger cars, or furniture; conductive clothings; filters; dryer belts for use in manufacture of sanitary products such as diapers and sanitary napkins; dryer canvasses for paper machines; and the like.

The flake-form conductive compound of this invention can be formed to a controlled thickness. The conductive compound also shows superior electroconducting properties because it is obtained by subjecting a base material having specific shape and potassium oxide content to a particular treatment that renders the base material electroconductive. In a particular case where it is loaded in a resin to prepare a primer composition, the primer composition can be applied on a plastic trim part to provide a primer layer having a thickness of about 1-10 μm. Also, a uniform surface resistivity at an approximate level of $10^4$-$10^8 \Omega$, suited for electrostatic coating, can be imparted to the primer layer. As such, the flake-form conductive compound of this invention shows desirable characteristics that are not found in conventional conductive materials.

Also, the flake-form conductive compound of this invention has high whiteness and opacifying properties because of its base material comprising titanic acid. The conductive compound, when incorporated in a resin, can provide a coating film which not only exhibits conducting properties but also has markedly high opacifying properties. In general, where a sharp color is demanded, a primer is applied prior to electrostatic coating. In this case, it is very often that a resin surface to be coated has a black color. Accordingly, the primer needs to provide a primer layer which can opacify this black color. In this respect, the present material having whiteness and opacifying properties, as attributed to titanic acid, are very useful. The use of this primer becomes more advantageous when it has a white color, because a sharp color such as red, blue or yellow, as well as a light color such as beige, aqua blue or pink, can be electrostatically applied. This primer can also be used when a deep color, such as black or silver, is electrostatically applied.

The present conductive composition containing the flake-form conductive compound of the present invention generally exhibits a surface conductivity within a very low level of $10^{-2}$-$10^{10} \Omega$ and shows good electroconducting properties. Particularly, the composition of this invention containing a matrix resin exhibits surface resistivity that is controllable arbitrarily without affecting its film-forming properties. Therefore, the conductive composition readily provides a thin film having an approximate surface resistivity of $10^4$-$10^8 \Omega$ and an approximate thickness of 1-10 μm.

Advantageously, the conductive composition of the present invention presents high dimensional accuracy because of its low mold shrinkage factor and provides high mechanical strength.

DESCRIPTION OF THE PREFERRED EXAMPLES

The present invention is below described specifically by referring to Synthesis Examples, Examples and Comparative Examples.

Synthesis Example 1

27.64 g of potassium carbonate, 4.91 g of lithium carbonate, 69.23 g of titanium dioxide and 74.56 g of potassium chloride were dry ground and mixed to provide a raw material which was subsequently calcined at 1,100° C. for 4 hours. After calcination, the resulting sample was immersed in 10 kg pure water, stirred for 20 hours, separated, washed with water and dried at 110° C. This resulted in obtaining a white powder which was identified as a layered titanate $K_{0.80}Li_{0.266}Ti_{1.733}O_4$ with an average major diameter of 44 μm and an average thickness of 3 μm.

65 g of this $K_{0.80}Li_{0.266}Ti_{1.733}O_4$ was dispersed with stirring in 5 kg of 3.5% hydrochloric acid to exchange K ions and Li ions with hydrogen ions or hydronium ions. The subsequent separation and washing with water resulted in obtaining a layered titanic acid. The amount of $K_2O$ remained in the layered titanic acid was found to be 2.0 weight %. The percentage of exchange of K ions was 92% and the percentage of exchange of Li ions was 99% or over. The percentage of exchange of K ions and Li ions, in combination, was 94%. This layered titanic acid was dispersed in 5 kg water. Subsequently, 250 g (11 equivalent %) of a 1 wt % aqueous solution of n-propylamine was added thereto with stirring. After about 30 minutes of stirring, 3.5% hydrochloric acid was added to adjust the dispersion to a pH of 2.0. After an hour of stirring, the dispersion was separated by suction filtration. The resulting wet cake was dispersed in water, washed with water and separated again. This process was repeated three times to achieve sufficient washing. The resultant was dried at 110° C. for 15 hours and subsequently disintegrated by a mixer to obtain flake-form titanic acid. This powder was found to have a potassium content of 1.1 weight %, in terms of potassium oxide ($K_2O$), an average major diameter of 30 μm and an average thickness of 0.3 μm.

Synthesis Example 2

27.64 g of potassium carbonate, 4.91 g of lithium carbonate, 69.23 g of titanium dioxide and 74.56 g of potassium chloride were dry ground and mixed to provide a raw material which was subsequently calcined at 950° C. for 4 hours. After calcination, the resulting sample was immersed in 10 kg pure water, stirred for 20 hours, separated, washed with water and dried at 110° C. This resulted in obtaining a white powder which was identified as a layered titanate $K_{0.80}Li_{0.266}Ti_{1.733}O_4$ with an average major diameter of 9 μm and an average thickness of 1 μm.

13 g of this $K_{0.80}Li_{0.266}Ti_{1.733}O_4$ was dispersed with stirring in 200 kg of 1.75% hydrochloric acid to exchange K ions and Li ions with hydrogen ions or hydronium ions. The subsequent separation and washing with water resulted in obtaining a layered titanic acid. The amount of $K_2O$ remained in the layered titanic acid was found to be 6.0%. The percentage of exchange of K ions was 76% and the percentage of exchange of Li ions was 99% or over. The percentage of exchange of K ions and Li ions, in combination, was 82%. This layered titanic acid was dispersed in 600 g water. Subsequently, 250 g (22 equivalent %) of a 0.6% aqueous solution of 3-methoxypropylamine was added thereto with stirring. After about an hour of stirring, 100 g of 3.5% hydrochloric acid was added. After stirring at 60° C., the dispersion was separated by suction filtration. The wet cake was dispersed in water, washed with water and separated again. This process was repeated three times to achieve sufficient washing. The resultant was dried at 110° C. for over 15 hours and subsequently disintegrated by a mixer to obtain a powder of flake-form titanic acid. This powder was found to have a residual $K_2O$ content of 2.1%, an average major diameter of 6.2 μm and an average thickness of 0.04 μm.

Synthesis Example 3

27.64 g of potassium carbonate, 4.91 g of lithium carbonate and 69.23 g of titanium dioxide were dry ground and mixed to provide a raw material which was subsequently calcined at 850° C. for 4 hours. The resulting layered titanate was identified as $K_{0.80}Li_{0.266}Ti_{1.733}O_4$ and, after grinding, exhibited an average major diameter of 5 μm and an average thickness of 2 μm. 65 g of this $K_{0.80}Li_{0.266}Ti_{1.733}O_4$ was dispersed with stirring in 5 kg of 3.5% hydrochloric acid and then filtered. The resultant was washed with 5 kg of 2% hydrochloric acid on a Buchner funnel to obtain a layered titanic acid which contained hydrogen ions or hydronium ions in exchange for K ions and Li ions. The layered titanic acid was then washed with water and its residual $K_2O$ content was found to be 0.14%. The percentage of exchange of K ions and Li ions, in combination, was 99.6%. This layered titanic acid was dispersed in 5 kg water to which 250 g (11 equivalent %) of a 1% aqueous solution of n-propylamine was subsequently added with stirring. After about 30 minutes of stirring, 3.5% hydrochloric acid was added to adjust the dispersion to a pH of 2.0. After an hour of stirring, the dispersion was separated by suction filtration. The resulting wet cake was dispersed in water, washed with water and separated again. This process was repeated three times to achieve sufficient washing. The resultant was dried at 110° C. for 15 hours and then disintegrated by a mixer to obtain a powder of flake-form titanic acid. This powder was found to consist of a stack of very thin titanic acid layers having a thickness of 0.1 μm or below and have a form of a plate having a dimension larger than the original particle size. Its average major diameter and average thickness were determined to be 10 μm and 0.5 μm, respectively.

Synthesis Example 4

27.64 g of potassium carbonate, 4.91 g of lithium carbonate, 69.23 g of titanium dioxide and 74.56 g of potassium chloride were dry ground and mixed to provide a raw material. The raw material was packed in a double pot furnace having an inner platinum container, heated therein to 1,200° C. and then cooled to 600° C. at a rate of 4° C./hr before it was removed from the furnace. After the calcination, the resulting sample was immersed in 10 kg pure water, stirred for 20 hours, separated, washed with water and then dried at 110° C. This resulted in obtaining a white powder which was identified as a layered titanate $K_{0.80}Li_{0.266}Ti_{1.733}O_4$ with an average major diameter of 80 μm and an average thickness of 5 μm.

13 g of this $K_{0.80}Li_{0.266}Ti_{1.733}O_4$ was dispersed with stirring in 200 g of 1.75% hydrochloric acid to exchange K ions and Li ions with hydrogen ions or hydronium ions, so that a layered titanic acid was obtained. After washed with water, the layered titanic acid revealed a residual $K_2O$ content of 6.0%. The percentage of exchange of K ions was 76% and the percentage of exchange of Li ions was 99% or over. The percentage of exchange of K ions and Li ions, in combination, was 82%. This layered titanic acid was dispersed in 600 g water. Subsequently, 250 g (22 equivalent %) of a 0.6% aqueous solution of 3-methoxypropylamine was added thereto with stirring. After about an hour of stirring, 3.5% hydrochloric acid was added. After stirred at 60° C., the dispersion was separated by suction filtration. The wet cake was dispersed in water, washed with water and separated again. This process was repeated three times to achieve sufficient washing. The resultant was dried at 110° C. for over 15 hours and subsequently disintegrated by a mixer to obtain a powder of flake-form titanic acid. This powder was found to have a residual $K_2O$ content of 4.5%, an average major diameter of 80 μm and an average thickness of 0.7 μm.

Synthesis Example 5

28.3 g of potassium carbonate, 11.7 g of magnesium hydroxide, 64 g of titanium dioxide and 75 g of potassium chloride were dry ground and mixed to provide a raw material which was subsequently calcined at 1,150° C. for 10 hours. After calcination, the resulting sample was immersed in 10 kg pure water, stirred for 20 hours, separated, washed with water and dried at 110° C. This resulted in obtaining a white powder having an average major diameter of 5 μm and an average thickness of 1 μm.

65 g of this $K_{0.80}Mg_{0.40}Ti_{1.60}O_4$ was dispersed with stirring in 5 kg of 3.5% hydrochloric acid to exchange K ions and Li ions with hydrogen ions or hydronium ions. This operation was repeated three times. The subsequent separation and washing with water resulted in obtaining a layered titanic acid. The amounts of $K_2O$ and MgO remained in the layered titanic acid were found to be 0.5% and 1.0%, respectively. The percentage of exchange of K ions was 98% and the percentage of exchange of Mg ions was 92%. The percentage of exchange of K ions and Mg ions, in combination, was 96%. This layered titanic acid was dispersed in 5 kg water. Subsequently, 500 g (23 equivalent %) of a 1% aqueous solution of n-propylamine was added thereto with stirring. After about 30 minutes of stirring, 3.5% hydrochloric acid was added to adjust the dispersion to a pH of 2.0. After an hour of stirring, separation was carried out. The wet cake was dispersed in water, washed with water and separated again. This operation was repeated three times to achieve sufficient washing. The resultant was dried at 110° C. for 15 hours and subsequently disintegrated by a mixer to obtain a powder of flake-form titanic acid. This powder was found to have a residual $K_2O$ content of 0.5%, an average major diameter of 5 μm and an average thickness of 0.3 μm.

Synthesis Example 6

28.3 g of potassium carbonate, 11.7 g of magnesium hydroxide, 64 g of titanium dioxide and 75 g of potassium chloride were dry ground and mixed to provide a raw material which was subsequently calcined at 1,100° C. for 3 hours. After calcination, the resulting sample was immersed in 10 kg pure water, stirred for 20 hours, separated, washed with water and dried at 110° C. This resulted in obtaining a white powder having an average major diameter of 23 μm and an average thickness of 3 μm.

65 g of this $K_{0.80}Mg_{0.40}Ti_{1.60}O_4$ was dispersed with stirring in 5 kg of 3.5% hydrochloric acid to exchange K ions and Li ions with hydrogen ions or hydronium ions. This operation was repeated three times. The subsequent separation and washing with water resulted in obtaining a layered titanic acid. The amounts of $K_2O$ and MgO remained in the layered titanic acid were found to be 1.2% and 1.0%, respectively. The percentage of exchange of K ions was 95% and the percentage of exchange of Mg ions was 92%. The percentage of exchange of K ions and Mg ions, in combination, was 93%. This layered titanic acid was dispersed in 5 kg water. Subsequently, 500 g (23 equivalent %) of a 1% aqueous solution of n-propylamine was added thereto with stirring. After about 30 minutes of stirring, 3.5%. hydrochloric acid was added to adjust the dispersion to a pH of 2.0. After an hour of stirring, separation was carried out. The wet cake was dispersed in water, washed with water and separated again. This operation was repeated three times to achieve sufficient washing. The resultant was dried at 110° C. for 15 hours and subsequently disintegrated by a mixer to obtain a powder of flake-form titanic acid. This powder was found to have a residual $K_2O$ content of 1.0%, an average major diameter of 20 μm and an average thickness of 0.5 μm.

For each layered titanate in Synthesis Examples 1-6, its compositional formula, average major diameter and average thickness are shown in Table 1. Also, the average major diameter, average thickness and potassium content, in terms of potassium oxide ($K_2O$), for each flake-form titanic acid are shown in Table 1.

solution of sodium hydroxide was separately added dropwise to keep a whole reaction solution within the pH range of 1-4, as analogous to the first stage. After the end of the 2nd stage dropping reaction, the resultant was stirred for 30 minutes while its temperature and pH were left intact, and then left to cool to room temperature. Thereafter, the reaction product was filtered, washed with water, dewatered and dried. The dried product was heat treated in the air, i.e., in the oxidizing atmosphere, under the temperature and time conditions specified in Table 2 to obtain the flake-form conductive compound of the present invention.

The average major diameters, average thickness and potassium contents in terms of potassium oxide ($K_2O$) of the flake-form conductive compounds in Examples 1-6 were identical in values to those obtained for their respective raw materials, i.e., flake-form titanic acid samples, in Synthesis Examples 1-6.

The pH value when the stannic chloride and antimony trichloride were added, the pH value when the stannous chloride was added, and the heat treatment temperature and time for each of Examples 1-6 are listed in Table 2.

TABLE 1

| | | Synthesis Example | | | | | |
|---|---|---|---|---|---|---|---|
| | | 2 | 3 | 1 | 4 | 5 | 6 |
| Layered Titanate | Compositional Formula | $K_{0.80}Li_{0.266}Ti_{1.733}O_4$ | | | | $K_{0.80}Mg_{0.40}Ti_{1.60}O_4$ | |
| | Average Major Diameter (μm) | 9 | 5 | 44 | 80 | 5 | 23 |
| | Average Thickness (μm) | 1 | 2 | 3 | 5 | 1 | 3 |
| Flake-Form Titanic Acid | Average Major Diameter (μm) | 6.2 | 10 | 30 | 80 | 5 | 20 |
| | Average Thickness (μm) | 0.04 | 0.5 | 0.3 | 0.7 | 0.3 | 0.5 |
| | Potassium Content (%) | 2.1 | 3.6 | 1.1 | 4.5 | 0.5 | 1 |

Examples 1-6

The flake-form titanic acid obtained in each of Synthesis Examples 1-6, weighing 250 g, was dispersed in 2,500 ml water. The dispersion was stirred by a stirrer for 10 minutes while maintained at 70° C. to form a slurry. 130 g (23 weight %, in terms of Sn) of an aqueous solution of stannic chloride and 12.8 g of antimony trichloride were dissolved in 66.6 g of 12 wt. % hydrochloric acid to prepare a mixed solution. This mixed solution was added dropwise to the slurry over about 1 hour. Concurrently, a 15 wt. % aqueous solution of sodium hydroxide was separately added dropwise to keep a whole reaction solution within the pH range of 1-4. After the end of 1st stage dropping reaction, the resultant was stirred for 30 minutes while its temperature and pH were left intact.

Next, a mixed solution containing 130 g (23 weight % in terms of Sn) of an aqueous solution of stannous chloride and 100 g of 12 wt. % hydrochloric acid was added dropwise over about an hour. Concurrently, a 15 wt. % aqueous

TABLE 2

| | Ex. 2 | Ex. 3 | Ex. 1 | Ex. 4 | Ex. 5 | Ex. 6 |
|---|---|---|---|---|---|---|
| pH When Stannic Chloride and Antimony Trichloride were Added | 3.1 | 2.8 | 1.6 | 2.0 | 3.8 | 1.2 |
| pH When Stannous Chloride was Added | 4.8 | 3.5 | 2.8 | 3.0 | 3.8 | 2.1 |
| Heat Treatment Temperature (° C.) | 375 | 425 | 400 | 450 | 475 | 500 |
| Heat Treatment Time (hr) | 2.0 | 0.5 | 1.0 | 1.5 | 2.0 | 1.0 |

TEM (transmission electron microscope) observation confirmed these flake-form conductive compounds as being conductive materials each comprising a first conductive layer comprising tin oxide and antimony oxide and a second conductive layer comprising tin oxide on a face of titanium oxide as a core material. The average thickness of the first conductive layer was 10 nn and the average thickness of the second conductive layer was 8 nm. The first conductive layer was found to contain 21.0 parts by weight of antimony, in terms of antimony oxide, based on 100 parts by weight of tin oxide.

Comparative Example 1

The procedure of Example 1 was followed, except that granular titanium oxide (product name: JR, product of Teika Co., Ltd., average particle diameter of 0.27 μm) was used in place of the flake-form titanic acid obtained in Synthesis Example 1, to prepare a granular conductive compound.

Comparative Example 2

A precursor of the product obtained in Synthesis Example 1, i.e., the layered titanic acid was removed before it was rendered into thinner layers by the action of amine, dried and calcined at 500° C. for 1 hour to obtain flake-form titanium oxide (average major diameter of 30 μm, average thickness of 2 μm and potassium content of 1.9 weight % (in terms of potassium oxide ($K_2O$))). The procedure of Example 1 was followed, except that the thus-obtained flake-form titanium oxide was used in place of the flake-form titanic acid obtained in Synthesis Example 1, to prepare a flake-form conductive compound.

Comparative Example 3

The procedure of Example 1 was followed, except that titaniumoxide fibers (product name: FTL-200, product of Ishihara Sangyo Co., Ltd., average fiber diameter of 0.2 μm and average fiber length of 3 μm) was used in place of the flake-form titanic acid obtained in Synthesis Example 1, to prepare a fibrous conductive compound.

Comparative Example 4

27.64 g of potassium carbonate, 4.91 g of lithium carbonate, 69.23 g of titanium dioxide and 74.56 g of potassium chloride were dry ground and mixed to provide a raw material which was subsequently calcined at 1,100° C. for 4 hours. After calcination, the resulting sample was immersed in 10 kg pure water, stirred for 20 hours, separated, washed with water and dried at 110° C. This resulted in obtaining a white powder which was identified as a layered titanate $K_{0.80}Li_{0.266}Ti_{1.733}O_4$ with an average major diameter of 44 μm and an average thickness of 3 μm.

65 g of this $K_{0.80}Li_{0.266}Ti_{1.733}O_4$ was dispersed with stirring in 5 kg of 3.5% hydrochloric acid to exchange K ions and Li ions with hydrogen ions or hydronium ions. The subsequent separation and washing with water resulted in obtaining a layered titanic acid. The amount of $K_2O$ remained in the layered titanic acid was 2.0 weight %. The percentage of exchange of K ions was 92% and the percentage of exchange of Li ions was 99% or over. The percentage of exchange of K ions and Li ions, in combination, was 94%. This layered titanic acid was dispersed in 5 kg water. Subsequently, 250 g (11 equivalent %) of a 1 wt. % aqueous solution of n-propylamine was added thereto with stirring. After about 30 minutes of stirring, 3.5% hydrochloric acid was added to adjust the dispersion to a pH of 2.0. After an hour of stirring, the dispersion was separated by suction filtration. The resulting wet cake was dispersed in 1 N hydrochloric acid, heated to 70° C. and then stirred. The resultant was dispersed in water, washed with water and separated again. This operation was repeated three times to achieve sufficient washing. The resultant was dried at 110° C. for 15 hours and subsequently disintegrated by a mixer to obtain flake-form titanic acid. This powder was found to have a potassium content of 0.2 weight %, in terms of potassium oxide ($K_2O$), an average major diameter of 0.8 μm and an average thickness of 0.2 μm.

The volume resistivity (Ω·cm), average major diameter (μm) and average thickness (μm) for the conductive compounds obtained in the above Examples 1-6 and Comparative Examples 1-4, as well as the surface resistance (Ω) for the respective conductive compositions, were determined in accordance with the following procedures. The results are shown in Table 1.

(1) Volume Resistivity (Ω·cm)

0.5 g of each powder sample was packed in a polyacetal tubular container (outer diameter of 28 mm, inner diameter of 10 mm and length of 30 mm). Two copper rods each having a diameter identical in dimension to the inner diameter of the tubular container and serving as an electrode were inserted in the tubular container from its opposite ends to locate the sample powder between them. The copper rods were pressed against each other to compress the sample powder at a pressure of 100 kg/cm². Values for current and voltage between the electrodes (copper rods) were measured. A resistance value R (Ω) was calculated from the measurements. Also, the volume resistivity ρ (Ω·cm) was calculated from the sample thickness during measurement and the electrode area, in accordance with the following equation:

Volume resistivity ρ=resistance(Ω)×[electrode area ($cm^2$)/sample thickness (cm)]

(2) Average Major Diameter (μm) and Average Thickness (μm)

The average major diameter was determined by a laser diffraction particle-size distribution measurement device. The average thickness was determined by placing the sample under observation either by a scanning electron microscope (SEM) at the 1,000-10,000 magnification or by a transmission electron microscope (TEM) at the 10,000-1,000,000 magnification and then reading scales for actual values.

The conductive resin compositions of this invention and the comparative resin compositions were prepared according to the following procedure. Each of the flake-form conductive compounds obtained in Examples 1-6 was added to an acrylic binder (product name: Acrose Super FS Clear, 40% solids content, product of Dai Nippon Toryo Co., Ltd.) in the amount of 30% by weight of the solids, and then mixed with stirring to thereby prepare the conductive compositions.

The above procedure was followed, with the exception that the conductive compositions of Comparative Examples 1-4 were used in place of the conductive compounds of Examples 1-6, to thereby prepare the comparative compositions.

Each of the above-obtained conductive compositions of the present invention and comparative conductive compositions was coated onto a 50 μm thick PET film to provide a 5 μm thick dry film thereon and then dried. The surface resistance value (Ω) of the resulting coating film was measured using a measurement device (product name: Hiresta IP, for high resistance $10^4$-$10^{12}$Ω, and product name: Lowresta GP, for low resistance $10^{-5}$-$10^7$Ω, both manufactured by Mitsubishi Chem. Corp.). The results are shown in Table 3.

Also, the conductive resin compositions of this invention and the comparative resin compositions were prepared according to the following procedure. Each of the flake-form conductive compounds of Examples 1-6 was incorporated in 6,6-nylon (product name: Zytel, product of Du Pont) in the amount of 30% by weight and then kneaded to prepare pellets of the conductive compositions of this invention.

The above procedure was followed, except that the conductive compositions of Comparative Examples 1-4 were used in place of the conductive compounds of Examples 1-6, to prepare pellets of the comparative compositions.

Using the above-obtained pellets of the conductive compositions of this invention and comparative conductive compositions, the size (Mf) of each molded product after 24 hours from molding and the size (Mw) of the mold were measured according to the DIN-16901 method and then the shrinkage factor (%) was calculated from the following equation. The results are shown in Table 3.

Mold shrinkage factor(%)=$(Mw-Mf)/Mw \times 100$

In view of anisotropy during molding, each value listed in Table was obtained by dividing the difference between values measured in the direction of flow during resin molding and in the direction transverse thereto by 2.

TABLE 3

| | Ex. 2 | Ex. 3 | Ex. 1 | Ex. 4 | Ex. 5 | Ex. 6 |
|---|---|---|---|---|---|---|
| Particle Shape | Flaky | Flaky | Flaky | Flaky | Flaky | Flaky |
| Average Major Diameter (μm) | 6.2 | 10 | 30 | 80 | 5 | 20 |
| Average Thickness (μm) | 0.04 | 0.5 | 0.3 | 0.7 | 0.3 | 0.5 |
| Volume Resistivity (Ω · cm) | $8 \times 10^2$ | $1 \times 10^2$ | $8 \times 10^1$ | $9 \times 10^1$ | $7 \times 10^1$ | $6 \times 10^1$ |
| Surface Resistance (Ω) | $7 \times 10^6$ | $8 \times 10^6$ | $5 \times 10^6$ | $6 \times 10^6$ | $9 \times 10^6$ | $7 \times 10^6$ |
| Mold Shrinkage Factor (%) | 0.2 | 0.2 | 0.2 | 0.2 | 0.2 | 0.2 |

| | Comp. Ex. 1 | Comp. Ex. 2 | Comp. Ex. 3 | Comp. Ex. 4 |
|---|---|---|---|---|
| Particle Shape | Granular | Flaky | Fiber | Flaky |
| Average Major Diameter (μm) | 0.3 | 30 | 30 | 0.8 |
| Average Thickness (μm) | 0.3 | 2 | 0.3 | 0.2 |
| Volume Resistivity (Ω · cm) | $1 \times 10^2$ | $2 \times 10^2$ | $2 \times 10^2$ | $5 \times 10^3$ |
| Surface Resistance (Ω) | Over $10^{12}$ | $6 \times 10^9$ | $2 \times 10^{10}$ | Over $10^{13}$ |
| Mold Shrinkage Factor (%) | 0.2 | 0.2 | 1.0 | 0.2 |

It is clear from Table 3 that the resin composition containing each flake-form conductive composition of this invention, even if formed into a very thin film such as measuring 5 μm, exhibits a good surface resistance value. In contrast, it is clear that the 5 μm thick films formed from the conductive compositions of Comparative Examples 1-4 exhibit very poor surface resistance values to show the difficulty of thin-film formation.

The invention claimed is:

1. A flake-form conductive compound characterized as comprising titanium oxide having an average major diameter of 1-100 μm and an average thickness of 0.01-1.5 μm and containing 0.3-5% by weight of potassium in terms of potassium oxide ($K_2O$), a first conductive layer comprising tin oxide containing antimony and provided on a surface of the titanium oxide, and a second conductive layer comprising tin oxide and provided on the first conductive layer.

2. The flake-form conductive compound as recited in claim 1, wherein the first conductive layer contains 0.1-50 parts by weight of an antimony component in terms of antimony oxide ($Sb_2O_3$), based on 100 parts by weight of a tin component in terms of tin oxide ($SnO_2$).

3. The flake-form conductive compound as recited in claim 1, characterized as being obtainable by allowing a basic compound having an interlayer swelling effect to act on layered titanic acid to thereby delaminate the layered titanic acid into titanic acid flakes, applying a stannic compound to form said first conductive layer on the flake-form titanic acid, applying a stannous compound to form said second conductive layer on the first conductive layer and subjecting the combination to a heat treatment.

4. A conductive composition comprising a binder and the flake-form conductive compound as recited in claim 1.

5. The conductive composition as recited in claim 4, characterized as containing 100 parts by weight of the binder and 5-50 parts by weight of the flake-form conductive compound.

6. The conductive composition as recited in claim 4, wherein said binder is at least one selected from the group consisting of thermoplastic resins, thermosetting resins, inorganic aggregates and metal-containing organic compounds.

7. The conductive composition as recited in claim 5, wherein said binder is at least one selected from the group consisting of thermoplastic resins, thermosetting resins, inorganic aggregates and metal-containing organic compounds.

8. The flake-form conductive compound as recited in claim 2, characterized as being obtainable by allowing a basic compound having an interlayer swelling effect to act on layered titanic acid to thereby delaminate the layered titanic acid into titanic acid flakes, applying a stannic compound to form said first conductive layer on the flake-form titanic acid, applying a stannous compound to form said second conductive layer on the first conductive layer and subjecting the combination to a heat treatment.

9. A conductive composition comprising a binder and the flake-form conductive compound as recited in claim 8.

10. The conductive composition as recited in claim 9, characterized as containing 100 parts by weight of the binder and 5-50 parts by weight of the flake-form conductive compound.

11. The conductive composition as recited in claim 9, wherein said binder is at least one selected from the group consisting of thermoplastic resins, thermosetting resins, inorganic aggregates and metal-containing organic compounds.

12. The conductive composition as recited in claim 10, wherein said binder is at least one selected from the group consisting of thermoplastic resins, thermosetting resins, inorganic aggregates and metal-containing organic compounds.

13. A conductive composition comprising a binder and the flake-form conductive compound as recited in claim 2.

14. The conductive composition as recited in claim 13, characterized as containing 100 parts by weight of the binder and 5-50 parts by weight of the flake-form conductive compound.

15. The conductive composition as recited in claim 13, wherein said binder is at least one selected from the group consisting of thermoplastic resins, thermosetting resins, inorganic aggregates and metal-containing organic compounds.

16. The conductive composition as recited in claim 14, wherein said binder is at least one selected from the group consisting of thermoplastic resins, thermosetting resins, inorganic aggregates and metal-containing organic compounds.

17. A conductive composition comprising a binder and the flake-form conductive compound as recited in claim 3.

18. The conductive composition as recited in claim 17, characterized as containing 100 parts by weight of the binder and 5-50 parts by weight of the flake-form conductive compound.

19. The conductive composition as recited in claim 17, wherein said binder is at least one selected from the group consisting of thermoplastic resins, thermosetting resins, inorganic aggregates and metal-containing organic compounds.

20. The conductive composition as recited in claim 18, wherein said binder is at least one selected from the group consisting of thermoplastic resins, thermosetting resins, inorganic aggregates and metal-containing organic compounds.

* * * * *